(12) United States Patent
Takahashi

(10) Patent No.: US 6,781,624 B1
(45) Date of Patent: Aug. 24, 2004

(54) SIGNAL PROCESSING APPARATUS

(75) Inventor: Hidekazu Takahashi, Isehara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/359,685

(22) Filed: Jul. 23, 1999

(30) Foreign Application Priority Data

Jul. 30, 1998 (JP) .......................................... 10-215684
Dec. 16, 1998 (JP) .......................................... 10-357620

(51) Int. Cl.⁷ .............................................. H04N 5/217
(52) U.S. Cl. ........................ 348/241; 348/607; 358/463
(58) Field of Search ................................ 348/241, 607; 358/463

(56) References Cited

U.S. PATENT DOCUMENTS 5,065,443 A * 11/1991 Farchmin .................... 382/273
5,942,920 A * 8/1999 Ueno .......................... 327/58

FOREIGN PATENT DOCUMENTS

GB          2072450 A * 9/1981    ........... H03F/01/02

* cited by examiner

Primary Examiner—Andrew Christensen
Assistant Examiner—Dorothy Wu
(74) Attorney, Agent, or Firm—Fitzpatrick, Cella, Harper & Scinto

(57) ABSTRACT

To realize low noise and chip area reduction, a signal processing apparatus including a signal source, an arithmetic circuit for performing an arithmetic operation, and a non-inverting output circuit for outputting a signal from the arithmetic circuit which includes at least a transfer circuit for transferring a signal from the signal source to the non-inverting output circuit, and a difference signal formation circuit for forming a difference signal obtained by subtracting a signal from the non-inverting output circuit from the signal from the signal source.

6 Claims, 20 Drawing Sheets

SIGNAL PROCESSING APPARATUS

BACKGROUND OF THE INVENTION

1. Field of the Invention

The present invention relates to a signal processing apparatus having a noise removing circuit, a signal processing apparatus for outputting individual signals of a plurality of signal sources and at least the maximum and minimum signals from a plurality of signal sources, and an image pickup apparatus using the signal processing apparatus.

2. Related Background Art

FIG. 1 is a signal processing apparatus for sequentially outputting signals.

Referring to FIG. 1, signals S1, S2, . . . , Sn are sequentially output to an output line 102 through a non-inverting output circuit (voltage follower circuit) 103 by controlling a MOS transistor 101 by a shift register 100.

FIG. 2 shows a photoelectric conversion apparatus having a noise removing circuit.

An amplified photoelectric conversion apparatus is disadvantageous because of large noise generated in pixels and therefore requires a noise removing circuit. Examples of amplified photoelectric conversion apparatus are a BASIS and CMOS sensor. Although FIG. 2 shows a CMOS sensor having a two-dimensional array of photoelectric conversion elements 70, even if the sensor is a linear sensor or a BASIS sensor, a same noise removing circuit is used in those sensors.

Referring to FIG. 2, the photoelectric conversion apparatus includes horizontal driving lines 71 for controlling lines, vertical output lines 72 for outputting pixel outputs to a noise removing circuit 74, amplified MOS transistors 73 of the pixels 70, load MOS transistors, and a constant current source. The noise removing circuit 74 is generally called an S-N noise removing circuit and comprises capacitances $C_{TN}$ 77 for storing N charges, capacitances $C_{TS}$ 78 for storing S charges, switch MOS transistors 75 and 76 for the capacitances, and horizontal driving MOS transistors 79 and 80 driven by a horizontal scanning circuit 85. An S signal and N signal are input to a differential amplifier 84 through voltage follower circuits 82 and 83, respectively, to remove noise and are output from the noise removing circuit. Let $V_P$ be the optical output from the pixel 70, $V_N$ be noise, $C_T$ be the storage capacitance value, and $C_H$ be the parasitic capacitance of the horizontal output line. Then, a final output $V_{OUT}$ is given by $$V_{out} = \frac{C_T}{C_T + C_H}\{(V_P + V_N) - V_N\} = \frac{C_T}{C_T + C_H}V_P$$

However, the prior arts have the following problems.

In the prior art shown in FIG. 1, since a signal is output through the non-inverting output circuit, the noise signal (e.g., offset signal) from the non-inverting output circuit is added and output together with the signal.

The prior art shown in FIG. 2 has the following problems:

(1) Since two large MOS capacitances are formed, the chip area increases. Especially, as the device shrinks in feature size, most area is occupied by the MOS capacitances, resulting in a serious problem.

(2) When the S capacitance value shifts from the N capacitance value, the noise correction effect degrades (variation in $C_T$)

(3) The sensitivity decreases to $C_T/(C_T+C_H)$ because of the capacitance division ratio of the storage capacitance to the parasitic capacitance.

SUMMARY OF THE INVENTION

It is the first object of the present invention to read out an accurate signal free from noise.

It is the second object of the present invention to reduce the chip area.

In order to achieve the above object, according to an aspect of the present invention, there is provided a signal processing apparatus comprising a signal source, a non-inverting output circuit for outputting a signal from the signal source, and noise signal removal means for, when the signal from the signal source is output from the non-inverting output circuit, removing a noise signal in the non-inverting output circuit and causing the non-inverting output circuit to output the signal from the signal source.

According to another aspect, there is provided a signal processing apparatus comprising a signal source, arithmetic means for performing an arithmetic operation, and a non-inverting output circuit for outputting a signal from the arithmetic means, wherein the arithmetic means including at least transfer means for transferring a signal from the signal source to the non-inverting output circuit, and difference signal formation means for forming a difference signal obtained by subtracting a signal from the non-inverting output circuit from the signal from the signal source.

According to still another aspect, there is provided a signal processing apparatus comprising a plurality of signal sources, a non-inverting output circuit for outputting signals from the plurality of signal sources, specific value signal output means for causing the non-inverting output circuit to output a maximum or minimum signal of at least two of the plurality of signal sources, and noise signal removal means for, when the signal from the signal source is output from the non-inverting output circuit, removing noise signal in the non-inverting output circuit and causing the non-inverting output circuit to output the signal from the signal sources.

According to still another aspect, there is provided a signal processing apparatus comprising a plurality of signal sources, specific value detection means for outputting a maximum or minimum signal of the plurality of signal sources, the specific value detection means having a function of sequentially outputting individual signals from the plurality of signal sources, and driving means for switching the function of the specific value detection means.

According to still another aspect, there is provided a signal processing apparatus comprising a plurality of signal sources, maximum detection means for outputting a maximum signal of the plurality of signal sources, minimum detection means for outputting a minimum signal of the plurality of signal sources, the maximum or minimum detection means having a function of sequentially outputting individual signals from the plurality of signal sources, and driving means for switching the function of the maximum or minimum detection means having the function of sequentially outputting the individual signals.

DETAILED DESCRIPTION OF THE PREFERRED EMBODIMENTS

Figure 1:
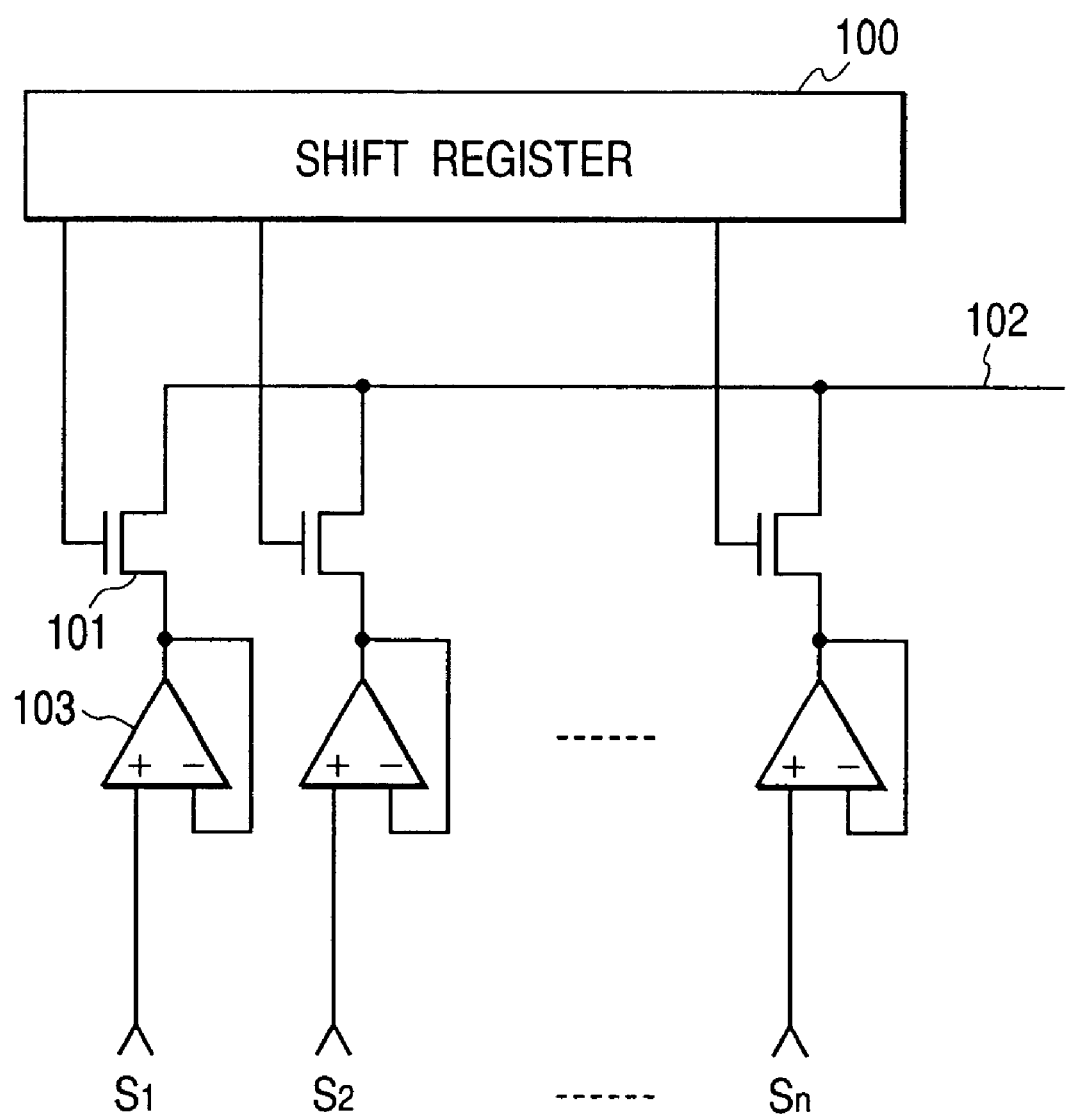
FIG. 1 is a circuit diagram showing the first prior art.
Figure 2:
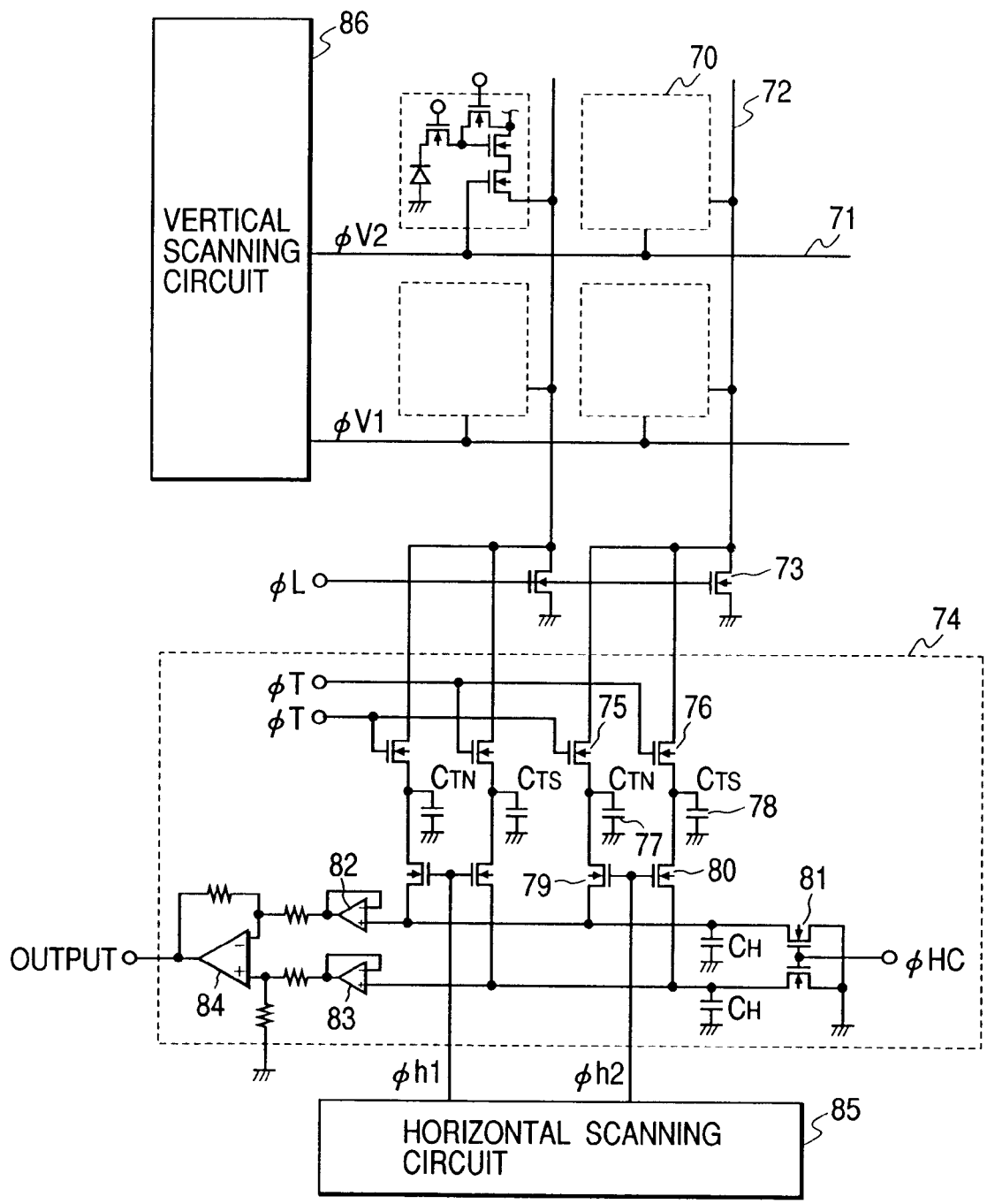
FIG. 2 is a circuit diagram showing the second prior art.
Figure 3:
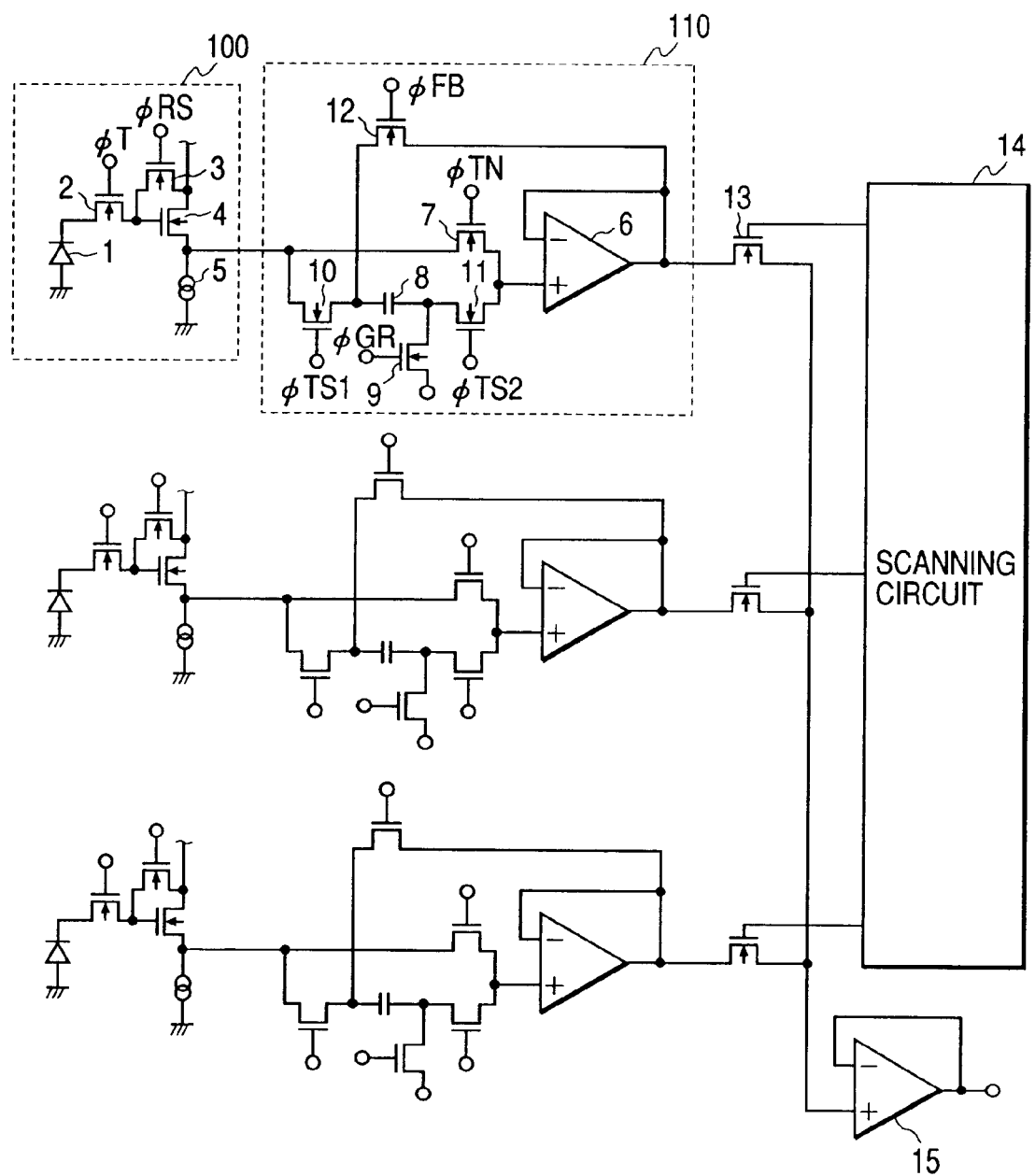
FIG. 3 is a circuit diagram showing the first embodiment of the present invention.

FIG. 3 shows the first embodiment which most clearly presents the characteristic feature of the present invention. Referring to FIG. 3, a pn photodiode 1 performs photoelectric conversion. A transfer gate 2 transfers photoelectrically converted charges. A reset MOS transistor 3 resets charges. An amplified MOS transistor 4 and constant current source 5 form a source follower circuit. The above components 1 to 5 construct one photoelectric conversion pixel. A differential amplifier 6 feeds back its output to the negative input terminal to perform voltage follower operation. A switch MOS transistor 7 inputs the output from the photoelectric conversion pixel to the voltage follower circuit. A clamp capacitance 8 and switch MOS transistor 9 for inputting the clamp potential construct a clamp circuit. A switch MOS transistor 10 inputs the output from the photoelectric conversion pixel to the clamp circuit. A switch MOS transistor 11 connects the clamp circuit and voltage follower circuit. A switch MOS transistor 12 inputs the output from the voltage follower circuit to the clamp circuit. The components 6 to 12 construct a noise removing circuit. A switch MOS transistor 13 outputs the photoelectric conversion output after noise removal to an output amplifier 15 and is driven by a scanning circuit 14.

Figure 4:
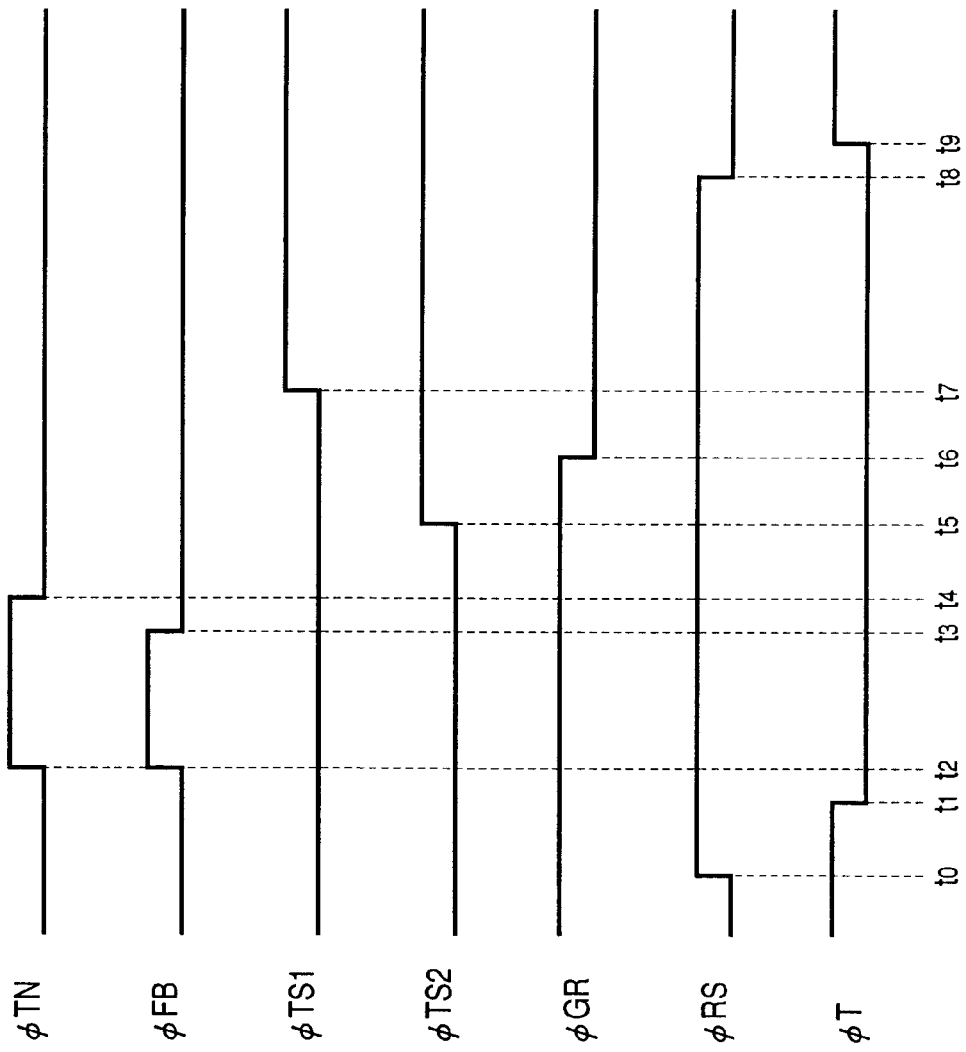
FIG. 4 is a timing chart of the first embodiment of the present invention.

The noise removal operation of the present invention will be described next with reference to the timing chart shown in FIG. 4.

At time $t_0$, signals φRS and φT are turned on to reset the photodiode. At time $t_1$, the signal φT is turned off to end reset of the photodiode to start accumulation.

At time $t_2$ when noise removal operation starts, signals φTN and φFB are turned on to input the output from the photoelectric conversion pixel to the voltage follower circuit 6 through the switch MOS transistor 7. The output from the voltage follower circuit is input to the clamp capacitance 8 through the switch MOS transistor 12. At times $t_3$ and $t_4$, the switch MOS transistors 12 and 7 are turned off in the order named. At this time, the clamp capacitance 8 holds a voltage as the sum of the sensor output with noise and offset voltage of the voltage follower circuit $$V_{CF}=V_{dark}+V_{FPN}+V_{RN}+V_{off} \quad (1)$$

($V_{dark}$=sensor dark voltage, $V_{FPN}$=fixed pattern noise voltage, $V_{RN}$=random noise voltage, and $V_{off}$=offset voltage of voltage follower circuit) At time $t_5$, a signal φTS2 is turned on to connect the clamp circuit to the voltage follower circuit. At time $t_6$, a signal φGR is turned off to end the clamp operation.

At time $t_7$, accumulation starts. After the elapse of a predetermined time, the signal read operation starts at times $t_8$ and $t_9$. At time $t_8$, the signal φRS is turned off, and then, at time $t_9$, the signal φT is turned on to transfer charges generated in the photodiode to the gate of the amplified MOS transistor 4 of the source follower circuit. The change in potential at this time is output as an optical signal.

The output from the source follower is represented by $$V_P+V_{dark}+V_{FPN}+V_{RN} \quad (2)$$

where $V_P$ is the optical signal voltage. This voltage is input to the clamp circuit through the switch MOS transistor 10. Because of the difference between this voltage and the already stored voltage (1), the output from the voltage follower circuit is given by $$V_{OUT}=(2)-(1)+V_{off}=V_P$$

That is, a signal from which not only noise of the photoelectric conversion pixel but also noise of the voltage follower circuit are removed can be obtained from the voltage follower circuit. In addition, since the signal can be output to the output amplifier 15 at the final stage without decreasing the gain, the gain does not decrease due to capacitance division.

Conventionally two large capacitances are required to prevent the decrease in gain due to capacitance division. However, in the present invention, a capacitance ½ or less that of the prior art suffices, so the capacitance area can be reduced to ¼ or less that of the prior art. The clamp capacitance value necessary in the present invention is preferably set in consideration of the ratio of the input capacitance to parasitic capacitance of the voltage follower.

As described above, according to the first embodiment, a high-sensitivity sensor with a small chip area corresponding to micropatterning can be realized. Particularly, this sensor has a tremendous effect as an AF sensor for a camera which requires real-time AGC because a nondestructive read is possible.

Figure 5:
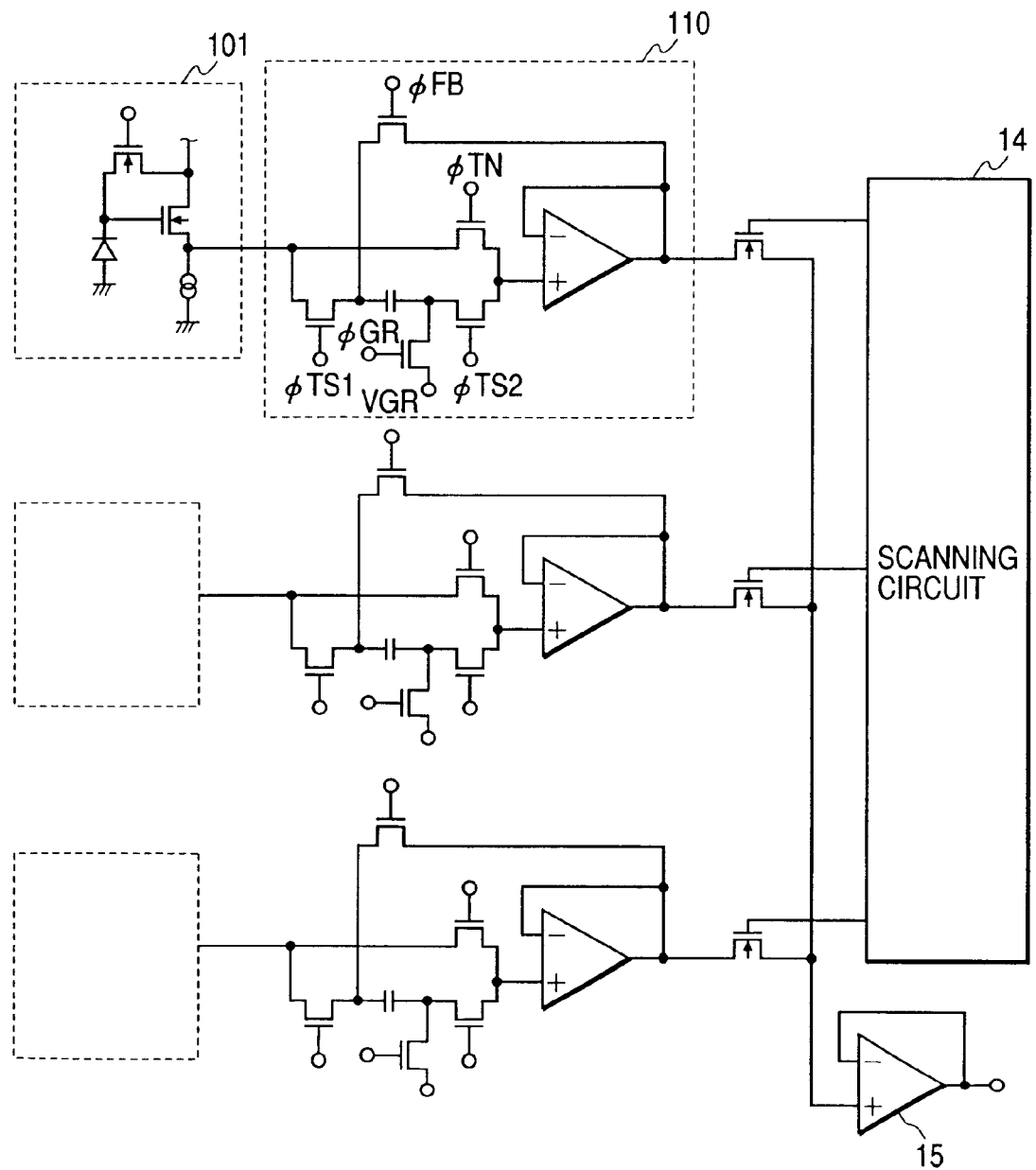
FIG. 5 is a circuit diagram showing the second embodiment of the present invention.

FIG. 5 shows the second embodiment of the present invention. In this embodiment, the present invention is applied to an AMI (Amplified Mos Imager) sensor which directly inputs the output from a photodiode to the gate of the amplified MOS transistor of a source follower circuit. In this embodiment, the same noise removing circuit as in the first embodiment is arranged, and the same effect as in the first embodiment can be obtained. In this embodiment, NMOS transistors are used in a photoelectric conversion pixel. However, the same effect as described can be obtained even in use of PMOS transistors, as in the first embodiment.

Figure 6:
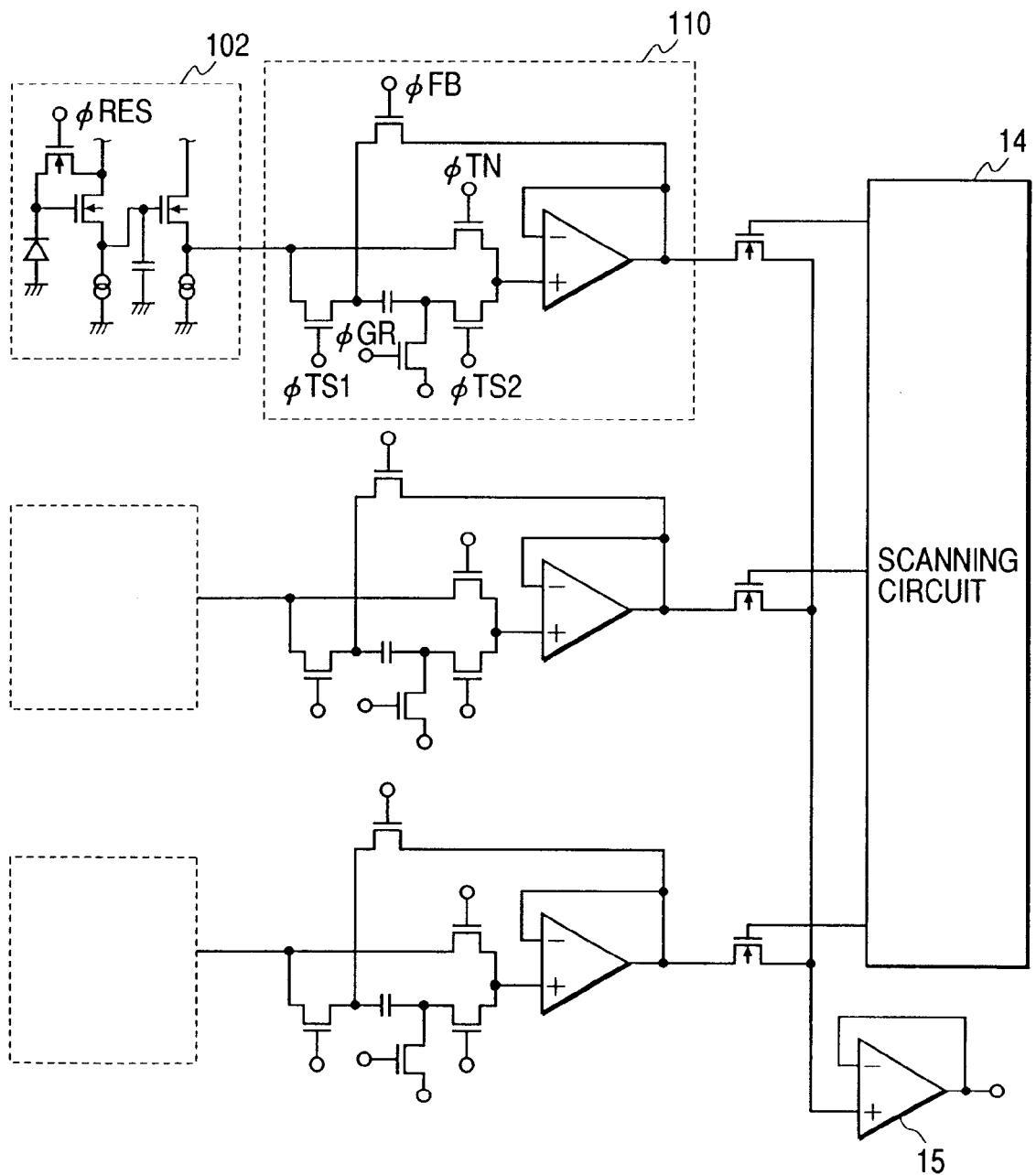
FIG. 6 is a circuit diagram showing the third embodiment of the present invention.

FIG. 6 shows the third embodiment of the present invention. In the sensor of this embodiment, a pixel has a source follower circuit with a two-stage structure, and the gate of the second source follower circuit has a memory capacitance. When this sensor is used as a contact sensor, the chip area can be made much smaller than that of the prior art. Hence, the cost can be largely reduced. Especially, this sensor is effective as a contact sensor of an equal magnification type.

In the present invention, transistors in a photoelectric conversion pixel can be formed from either NMOS transistors or PMOS transistors. Alternatively, NMOS transistor are used for the first stage while PMOS transistors are used for the second stage, or vice versa.

Figure 7:
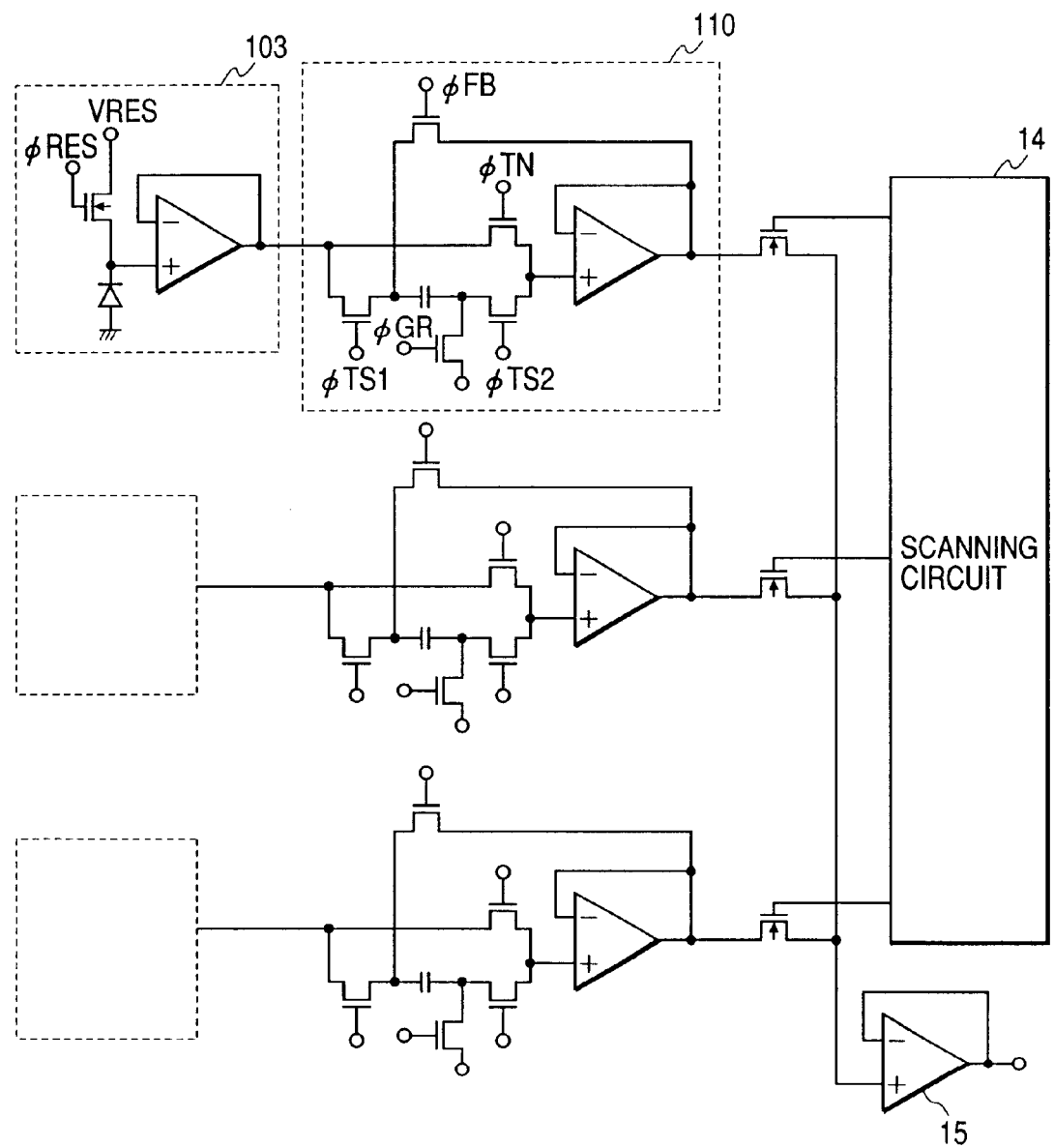
FIG. 7 is a circuit diagram showing the fourth embodiment of the present invention.

FIG. 7 shows the fourth embodiment of the present invention. The present invention uses a pixel in which the output from a photodiode is input to a voltage follower circuit with a CMOS structure.

In the fourth embodiment, since a voltage follower circuit formed from a differential amplifier is used, the FPN of the output from the pixel is small. By combining a noise removing circuit on the output side, noise can be further reduced.

This embodiment can be applied to a sensor which especially requires small noise. Particularly, the sensor is effective as an AF sensor for a camera.

In the first to fourth embodiments, the photoelectric conversion pixel is not limited to the above-described type. A photoelectric conversion pixel of a BASIS, CMD, SIT, or FGA may be used. The signal from the photodiode may be output without being amplified.

Figure 8:
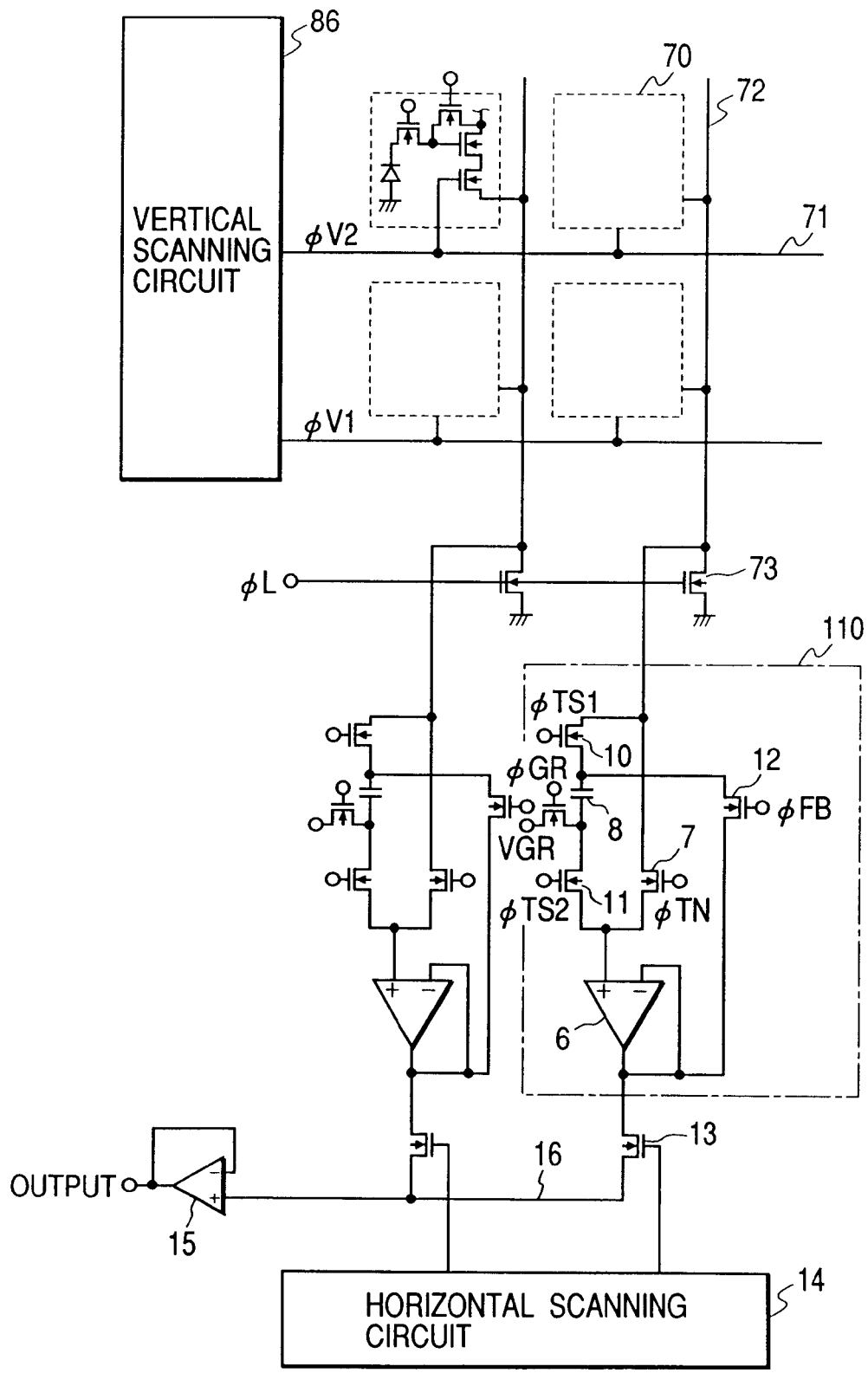
FIG. 8 is a circuit diagram showing the fifth and sixth embodiments of the present invention.

FIG. 8 shows the fifth embodiment of the present invention. In this embodiment, the present invention is applied to a two-dimensional photoelectric conversion apparatus. Referring to FIG. 8, photoelectric conversion elements 70 are two-dimensionally arrayed. This embodiment exemplifies a CMOS sensor. However, this embodiment can be applied to the photoelectric conversion pixel of a BASIS, CMD, SIT, or FGA. The signal from the photodiode may be output without being amplified. In this embodiment, since the present invention is applied to a two-dimensional photoelectric conversion apparatus, the same effect as in the linear photoelectric conversion apparatus, e.g., reduction of the chip area and increase in sensitivity can be obtained.

Figure 9A:
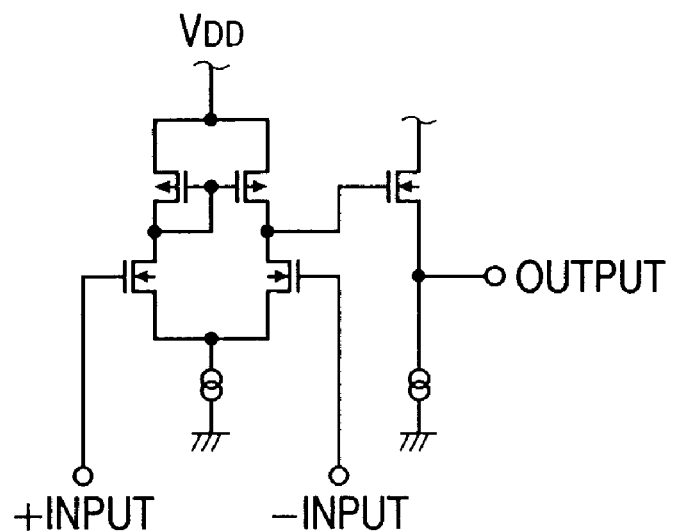
FIGS. 9A and 9B are circuit diagrams showing examples of a differential amplifier used in the present invention.
Figure 9B:
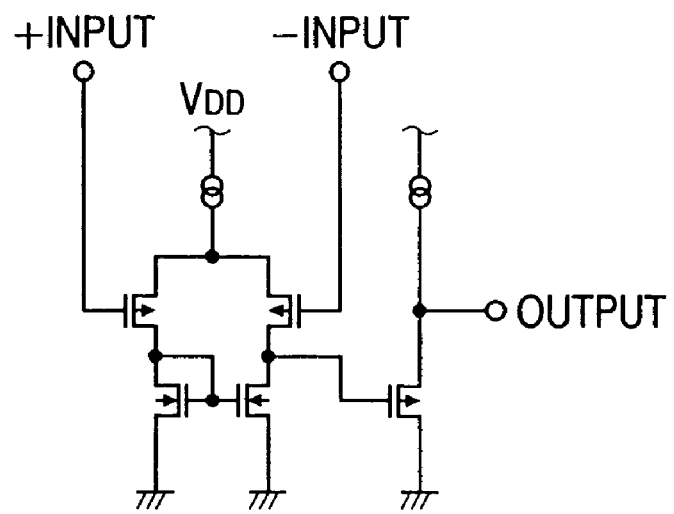

FIGS. 9A and 9B are circuit diagrams showing examples of the differential input circuit 6 used in the present invention. FIGS. 9A and 9B show CMOS differential amplifiers. However, a BiCMOS structure may be used. As for the circuit arrangement, the output may be of push-pull type. In other words, any types of differential amplifiers can be used.

As described above, in the fifth embodiment, noise removing circuits are arranged one for each column. However, noise removing circuits may be arranged one for each photoelectric conversion pixel.

FIG. 8 also shows the sixth embodiment of the present invention. In this embodiment, the peak signal (maximum or minimum signal) of photoelectric conversion pixels in one row is detected.

In the fifth embodiment, pulses are sequentially input from a horizontal scanning circuit 14 to switch MOS transistors 13, thereby outputting the signals from the photoelectric conversion pixels. In the sixth embodiment, instead of sequentially inputting pulses from the horizontal scanning circuit to the switch MOS transistors, pulses are simultaneously input to the switch MOS transistors. Signals from the photoelectric conversion pixels of one row are simultaneously output from a voltage follower circuit 6, thereby obtaining the peak signal of the photoelectric conversion pixels in one row. When, a voltage follower circuit using N-type transistors at the output stage, as shown in FIG. 9A, is used, the maximum signal of the photoelectric conversion pixels in one row is obtained. When a voltage follower circuit using P-type transistors at the output stage, as shown in FIG. 9B, is used, the minimum signal of the photoelectric conversion pixels in one row is obtained.

Assume that the voltage follower circuit shown in FIG. 9A is used for odd columns, and the voltage follower circuit shown in FIG. 9B is used for even columns. In this case, by simultaneously inputting a pulse from the horizontal scanning circuit to the switch MOS transistors 13 of odd columns and then simultaneously inputting a pulse from the horizontal scanning circuit to the switch MOS transistors 13 of even columns, almost the maximum or minimum signal of the photoelectric conversion pixel in one row can be obtained.

Figure 10:
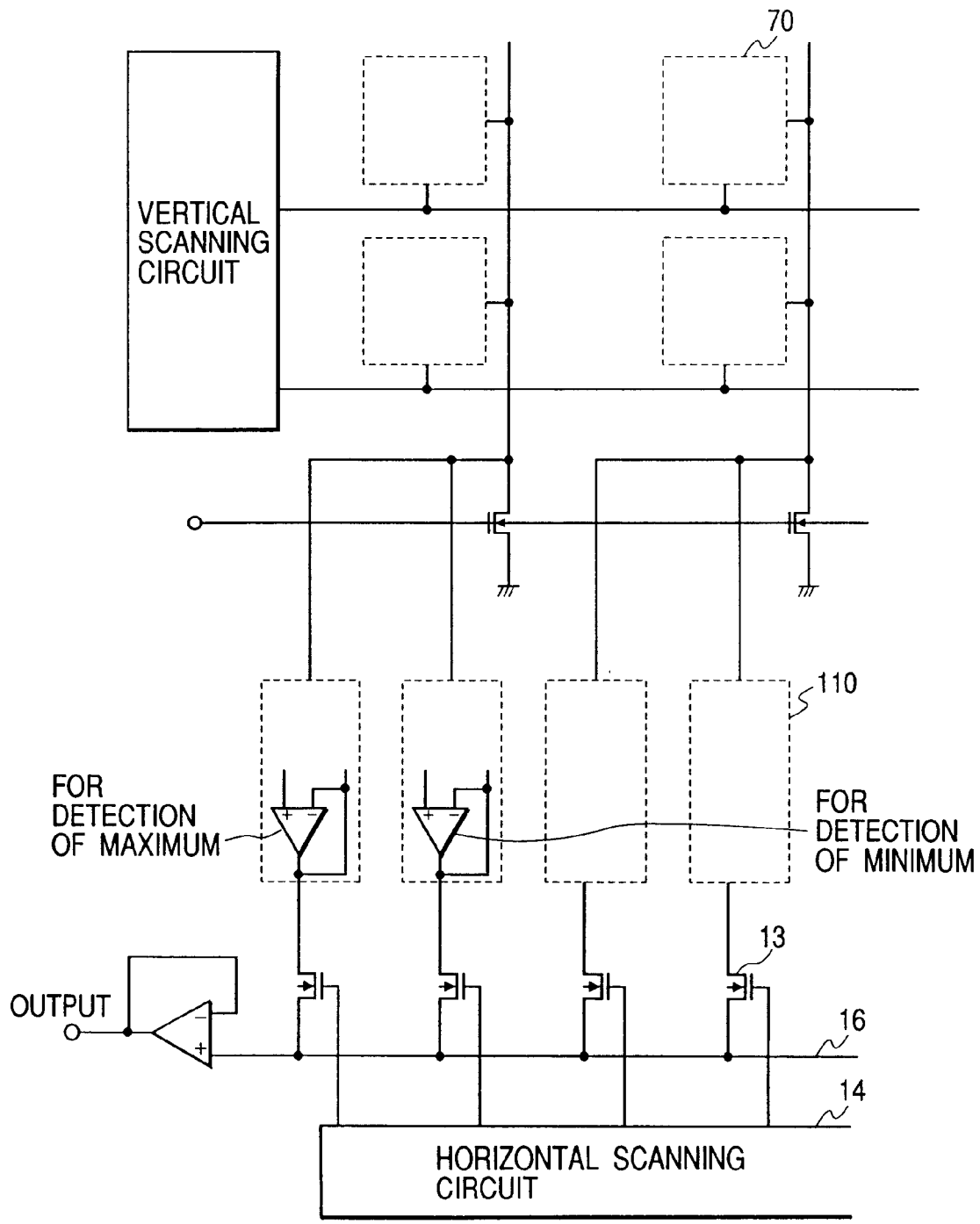
FIG. 10 is a circuit diagram showing the seventh embodiment of the present invention.

FIG. 10 shows the seventh embodiment of the present invention. In this embodiment, the peak signal (maximum or minimum signal) of photoelectric conversion pixels in one row is detected more accurately than in the sixth embodiment.

In the sixth embodiment, the maximum signal of odd photoelectric conversion pixels in one row and the minimum signal of even photoelectric conversion pixels in one row are obtained. Hence, an error may occur in a low-resolution sensor.

In the seventh embodiment, one column parallelly has a voltage follower circuit for detection of maximum (FIG. 9A) and that for detection of minimum (FIG. 9B). When a pulse is simultaneously input from the horizontal scanning circuit to switch MOS transistors connected to the voltage follower circuit for detection of maximum, the maximum signal of photoelectric conversion pixels in one row is output to the horizontal output line. When a pulse is simultaneously input from the horizontal scanning circuit to switch MOS transistors connected to the voltage follower circuit for detection of minimum, the minimum signal of photoelectric conversion pixels in one row is output to the horizontal output line.

When the horizontal scanning circuit has an arrangement capable of simultaneously inputting a pulse to a plurality of switch MOS transistors or an arrangement capable of sequentially inputting a pulse to a plurality of switch MOS transistors, as in the sixth or seventh embodiment, individual signals from the photoelectric conversion pixels and the maximum and minimum signals of photoelectric conversion pixels in one row can be obtained.

In the sixth and seventh embodiments, the peak signal of photoelectric conversion pixels in one row is obtained. However, the peak signal of photoelectric conversion pixels in one column may be obtained by simultaneously outputting a pulse from a vertical scanning circuit to all rows. Alternatively, when a plurality of arbitrary pulses are simultaneously output from the vertical and horizontal scanning circuits, the peak signal of an arbitrary area in the photoelectric conversion apparatus can be obtained.

Figure 11:
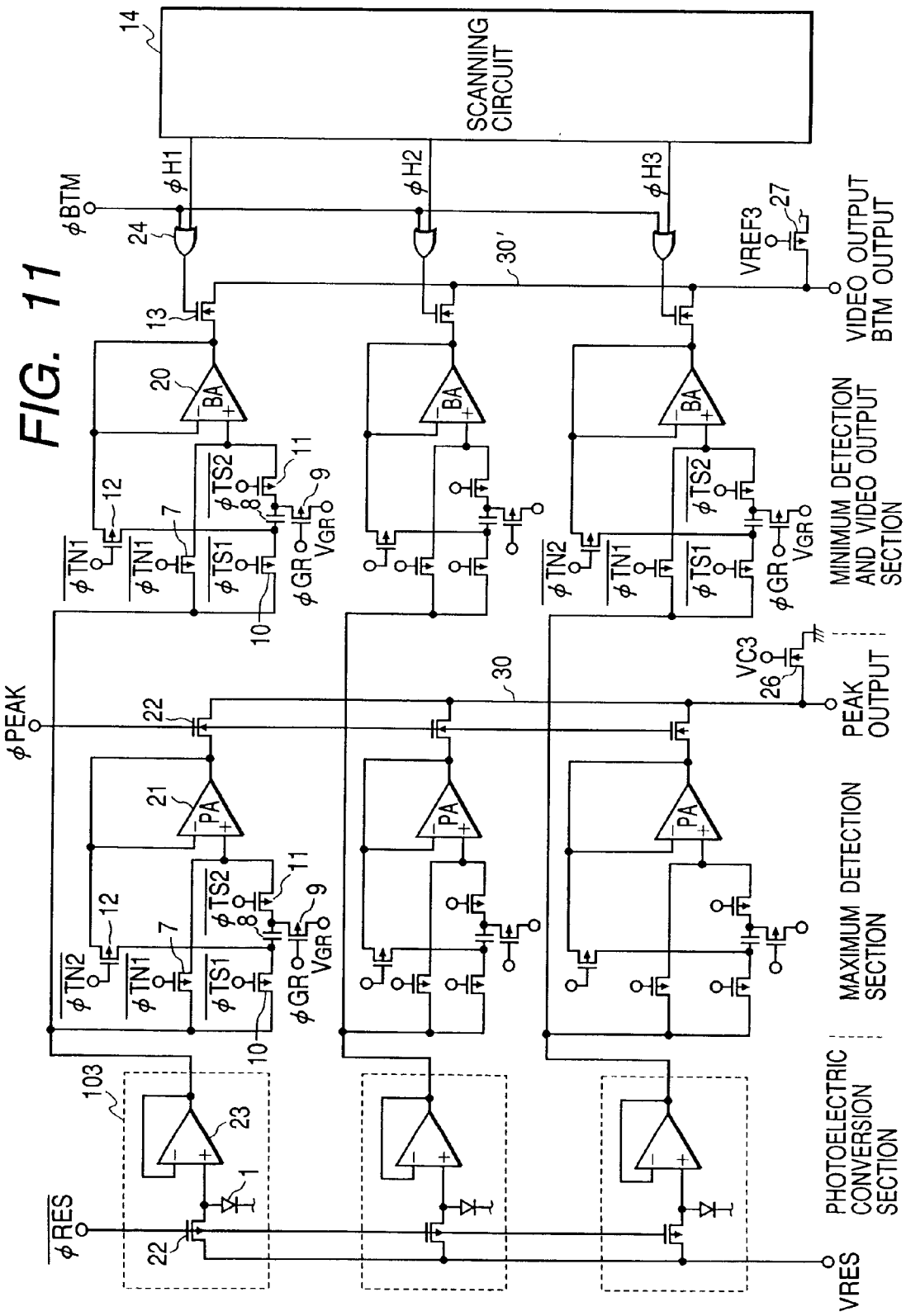
FIG. 11 is a circuit diagram showing the eighth embodiment of the present invention.
Figure 12:
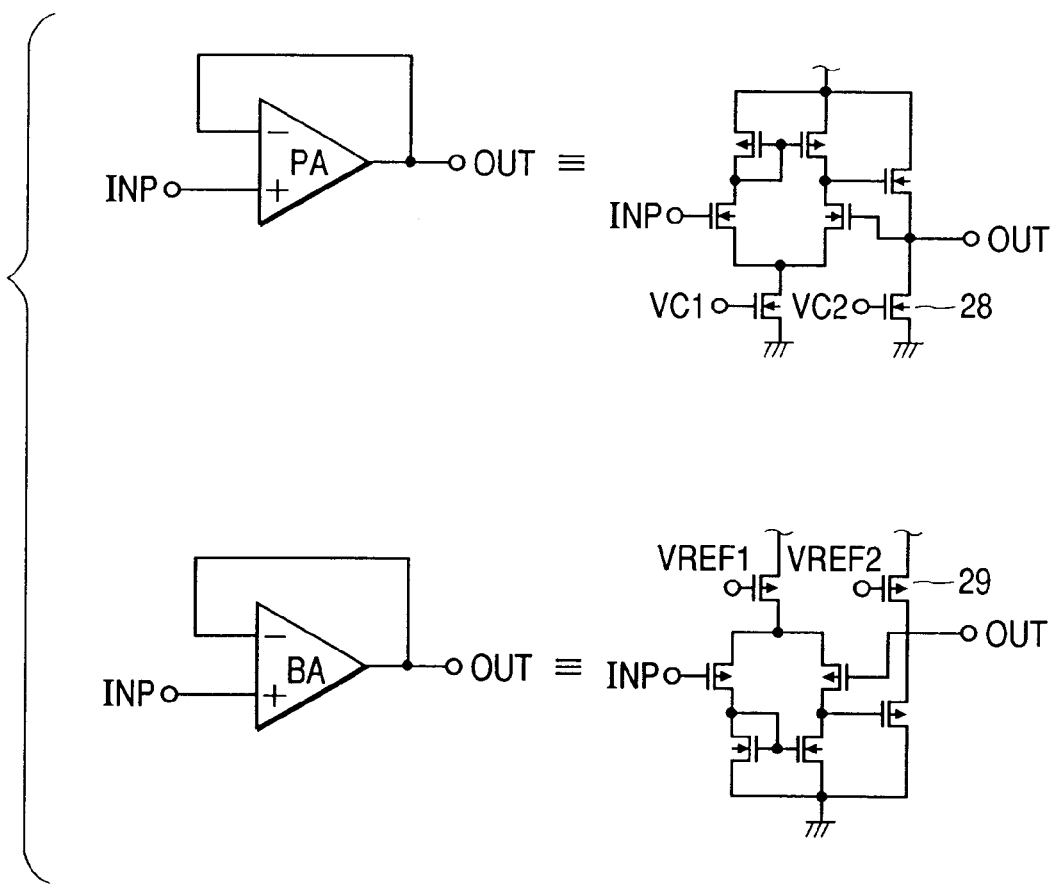
FIG. 12 is a circuit diagram showing the eighth embodiment of the present invention.

FIG. 11 is a circuit diagram showing the eighth embodiment. Referring to FIG. 11, a pn photodiode 1 for performing photoelectric conversion, a reset MOS transistor 22 for resetting the potential of the photodiode to $V_{RES}$, and a differential amplifier 23 construct one photoelectric conversion pixel 103. A clamp capacitance 8 and clamp MOS transistor 9 for inputting a clamp potential form a clamp circuit. The photoelectric conversion apparatus has switch MOS transistors 7, 10 and 11. Each of a differential amplifier 21 for detection of maximum and a differential amplifier 20 for detection of minimum constructs a voltage follower circuit. The apparatus also has a maximum output switch MOS transistor 22, minimum output switch MOS transistor 13, OR circuit 24, scanning circuit 14, and constant current MOS transistors 26 and 27. FIG. 12 shows specific circuit arrangements of the differential amplifiers 21 and 20. As the circuit for detection of maximum, a source follower circuit having NMOS transistors at the final stage is used. As the circuit for detection of minimum, a source follower circuit having PMOS transistors at the final stage is used.

Signals from the pixels are output to common output lines 30 and 30'.

Figure 13:
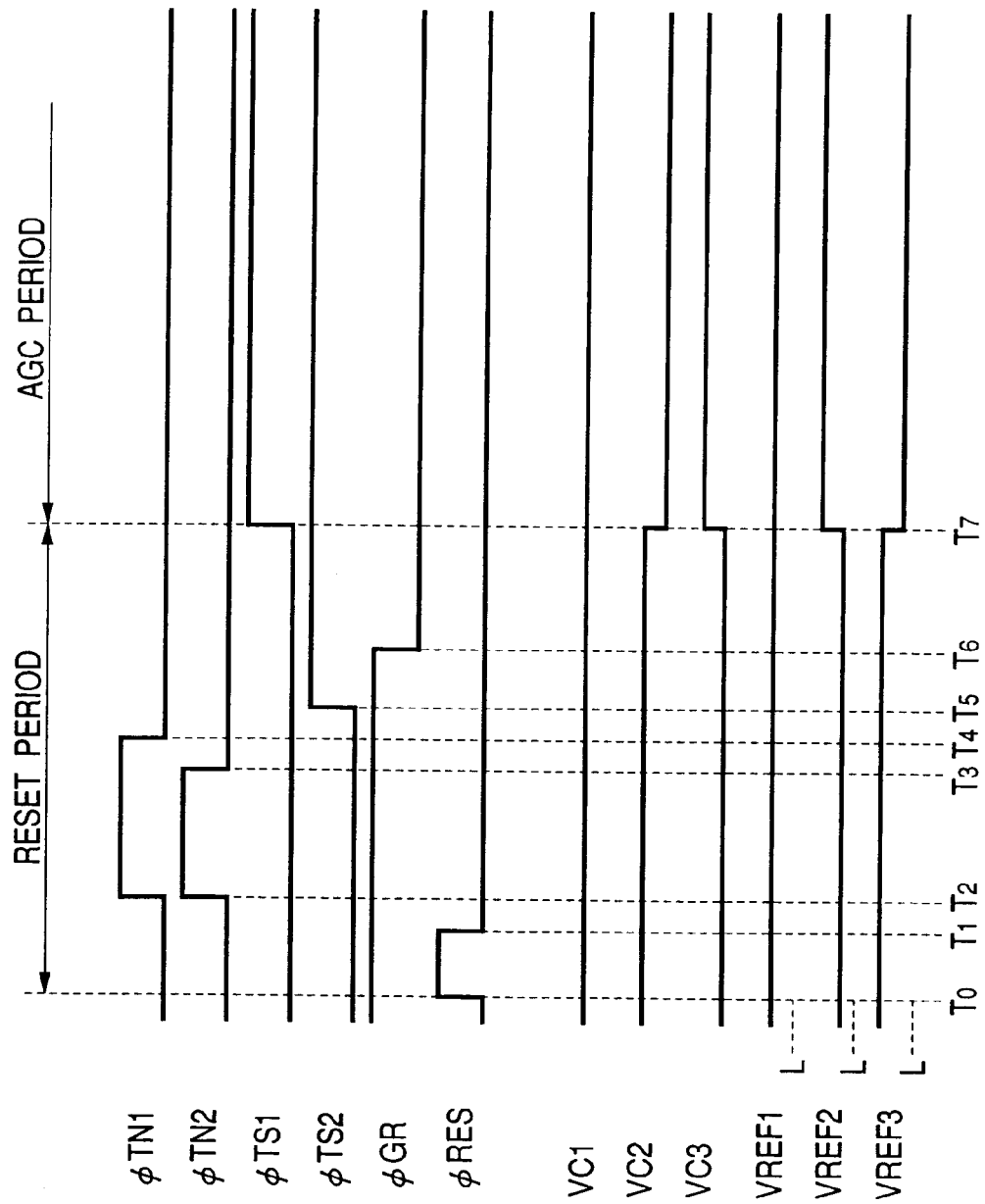
FIG. 13 is a timing chart of the eighth embodiment of the present invention.
Figure 14:
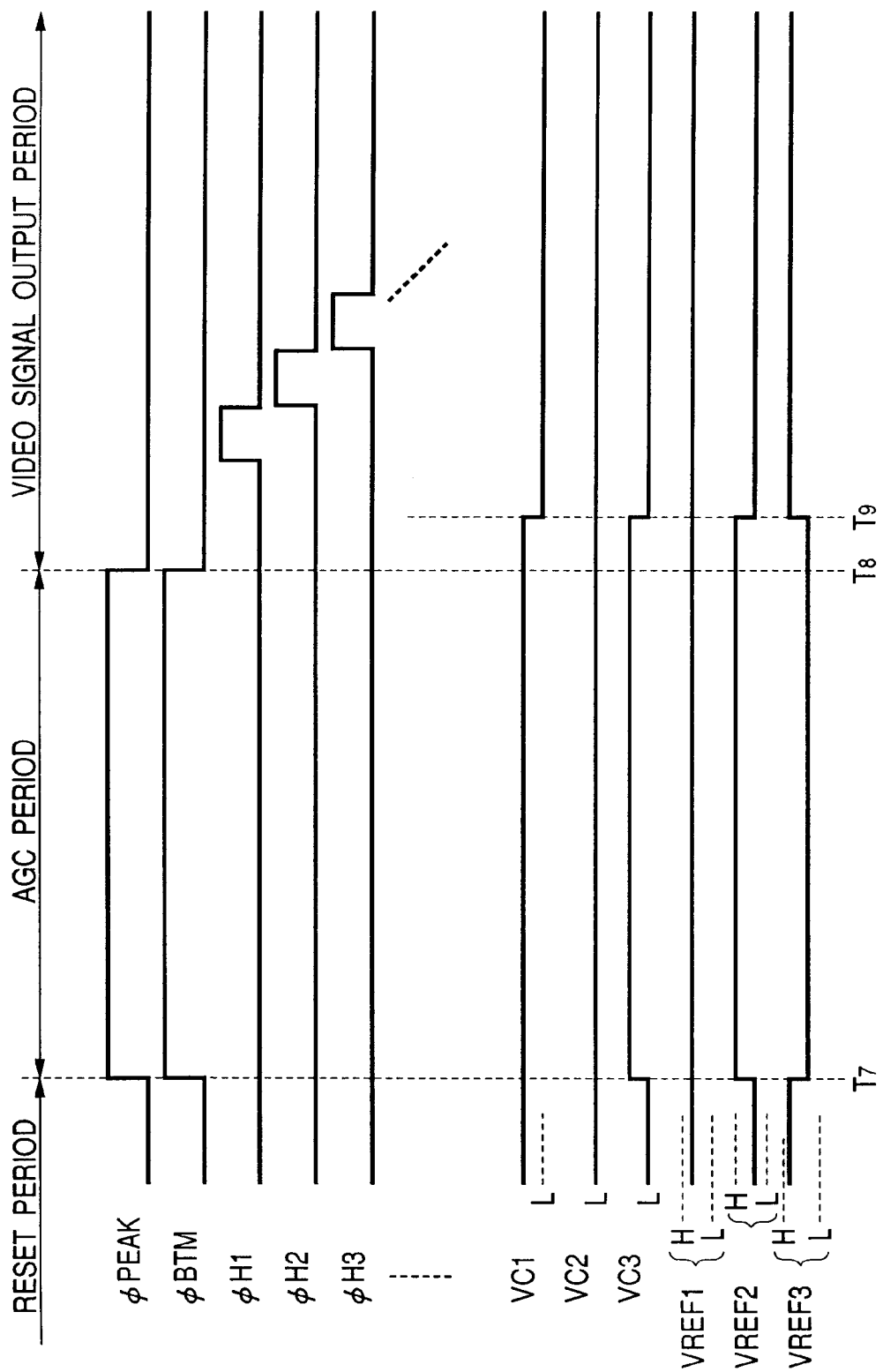
FIG. 14 is a timing chart of the eighth embodiment of the present invention.

The operation of this embodiment will be described next with reference to the timing charts shown in FIGS. 13 and 14. The operative state is divided into a reset period (noise removal period), accumulation period (AGC period), and video signal output period. The reset period will be described first. At time $T_0$, a signal φRES is set at high level to reset the potential of the pn photodiode 1. At time $T_1$, reset of the photodiode is ended. At time $T_2$ when noise removal starts, signals φTN1 and φTN2 are set at high level to turn on the switch MOS transistors 7 and 12. The output from the differential amplifier 23 for photoelectric conversion is input to the capacitance 8 of the clamp circuit through the switch MOS transistor 7, maximum detection circuit 21, and switch MOS transistor 12.

At times $T_3$ and $T_4$, the signals φTN1 and φTN2 are set at low level to turn off the switch MOS transistors 12 and 7. At times $T_5$ and $T_6$, a signal φTS2 is set at high level to turn on the switch MOS transistor 11, and a signal φGR is set at high level to turn off the clamp MOS transistor 9.

The clamp capacitance 8 holds a voltage as the sum of the noise component in the pixel and the offset component of the differential amplifiers 21 and 20. With the above process, the reset period for removing noise (offset) of the photoelectric conversion section, maximum detection section, and minimum detection section by clamping is ended.

At time $T_7$ when the accumulation period (AGC period) starts, signals φPEAK and φBTM are set at high level to turn on the switch MOS transistors 22 and 13. The outputs from the differential amplifiers 21 and 20 connected to pixels which will output the maximum and minimum are connected to the common output lines 30 and 30' to activate the constant currents 26 and 27.

When the signals φPEAK and φBTM are turned on to commonly connect the differential amplifiers 21 and 20 constructing the voltage follower circuits to the output lines 30 and 30', respectively, the output voltage of a pixel for outputting the maximum in the plurality of pixels is output to the common output line 30, and the output voltage from a pixel for outputting the minimum is output to the common output line 30'.

The voltage held by the clamp capacitance 9 is given by $$V_{CP}=V_{dark}+V_{RN}+V_{off} \quad (1)$$

($V_{dark}$=pixel dark voltage, $V_{FPN}$=fixed pattern noise voltage, $V_{RN}$=random noise voltage, and $V_{off}$=offset voltage of voltage follower circuit)

The output of the maximum or minimum from the pixel is represented by $$V_{PB}+V_{dark}+V_{FPN}+V_{RN} \quad (2)$$

where $V_{PB}$ is the maximum or minimum voltage. This voltage is input to the clamp circuit through the switch MOS transistor 11. Because of the difference between this voltage and the already stored voltage (1), the output from the differential amplifiers 21 and 20 is given by $$V_{OUT}=(2)-(1)+V_{off}=V_{PB}$$

That is, a signal from which not only noise of the photoelectric conversion pixel but also noise (offset component) of the differential amplifiers can be obtained from the amplifier.

At this time, constant current MOS transistors 28 and 29 on the output sides of the differential amplifiers 21 and 20 are turned off by setting a potential VC2 at low level and potential VREF2 at high level. When the accumulation time has elapsed, and (maximum)−(minimum) reaches a certain value, the AGC operation is ended to end accumulation operation.

From time $T_9$, the video signal read period starts. At time $T_9$, the potential $V_{REF2}$ is set at a set potential (potential at which a desired current is obtained) to activate and operate the constant current MOS transistor 28 of the differential amplifier 20. At time $T_{10}$, the scanning circuit 14 is scanned to sequentially output signals φH1, φH2, and φH3, thereby serially outputting a video signal.

With the above operation timing, the minimum detection circuit can have a video signal output function.

In this embodiment, a voltage follower circuit whose final stage is formed from a source follower is used in units of pixels. In outputting the minimum, the constant current source on the output side of each voltage follower is turned off to commonly connect the voltage follower circuits to the output lines connected to the constant current source, thereby obtaining the minimum of the video signal. In outputting a video signal, the constant current source on the output side of each voltage follower is turned on to sequentially connect the voltage follower circuits to the output lines, thereby obtaining a serial video signal In this embodiment, by decreasing the number of circuits, the chip area can be reduced as compared to the prior art. In addition, since the offset removal operation is performed, or the minimum output circuit and video signal output circuit are formed from the same circuit, the output offset can also be reduced.

In this embodiment, the final stages of the voltage followers of the differential amplifiers 21 and 20 are formed from source follower circuits that use MOS transistors. However, even when an emitter follower circuit using bipolar transistors is used, as in the prior art, the same effect as described above can be obtained.

Figure 15:
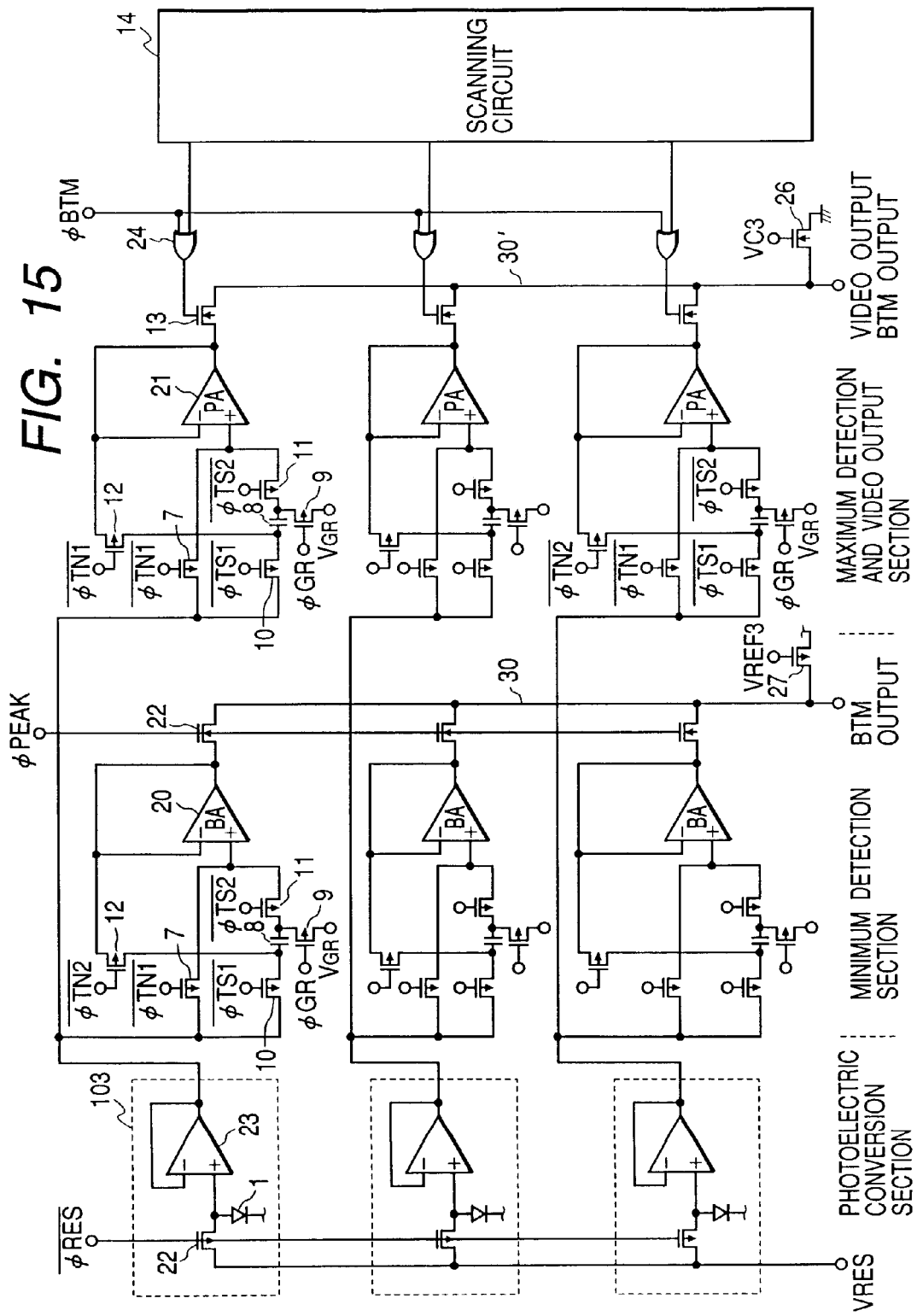
FIG. 15 is a circuit diagram showing the ninth embodiment of the present invention.

FIG. 15 is a circuit diagram showing the ninth embodiment of the present invention.

In the eighth embodiment, the minimum detection circuit has the video signal output function. In the ninth embodiment, a maximum detection circuit has a video signal output function.

In this embodiment as well, the chip area can be reduced, and the output offset can be decreased, as in the eighth embodiment.

Figure 16:
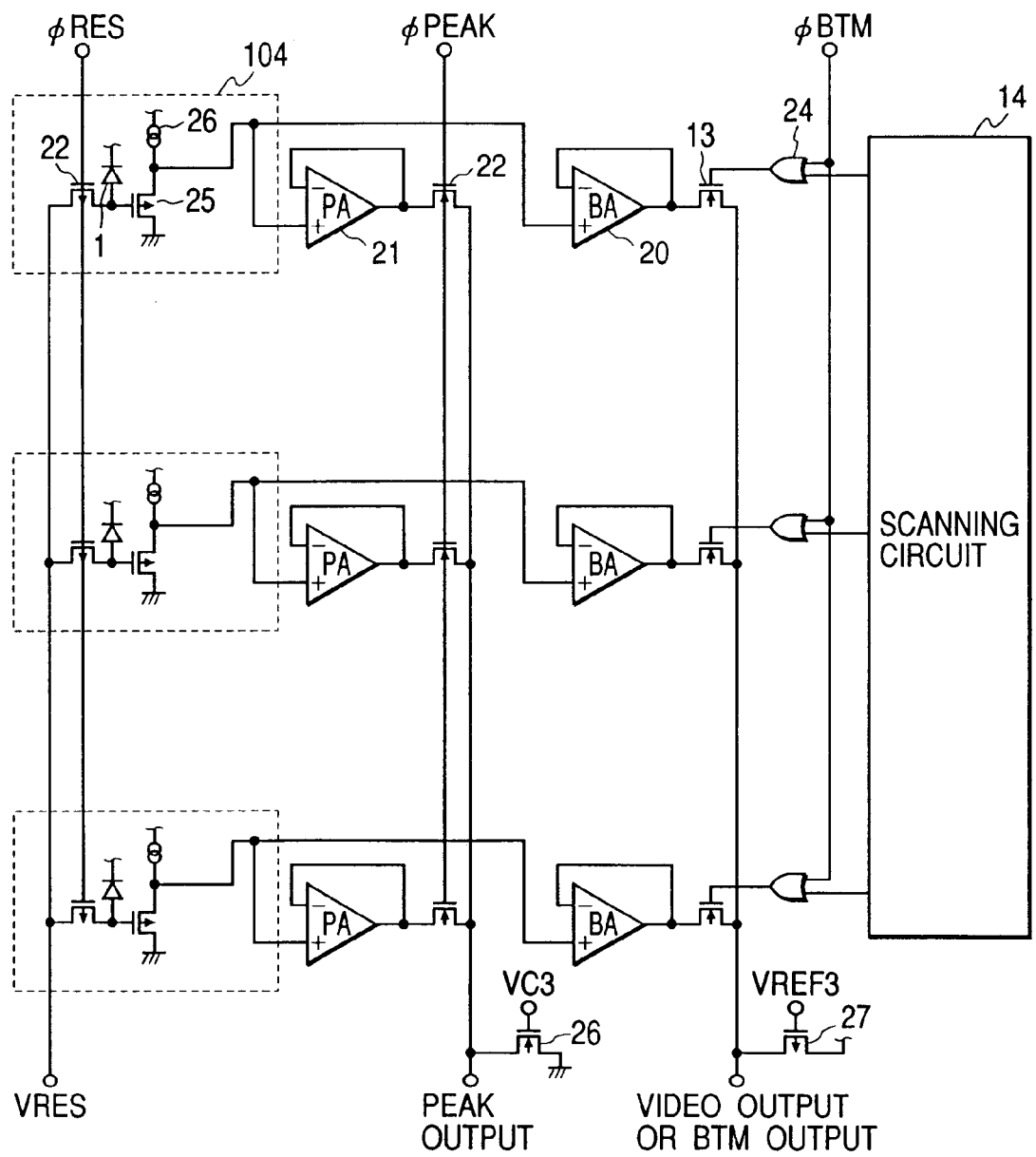
FIG. 16 is a circuit diagram showing the 10th embodiment of the present invention.

FIG. 16 is a circuit diagram showing the 10th embodiment of the present invention.

In this embodiment, the noise clamp circuit on the input side of maximum and minimum detection circuits is omitted. Accordingly, the output offset as noise increases. However, since the chip area can be largely reduced, this embodiment is effective for a photoelectric conversion apparatus which puts priority on cost rather than performance.

Figure 17:
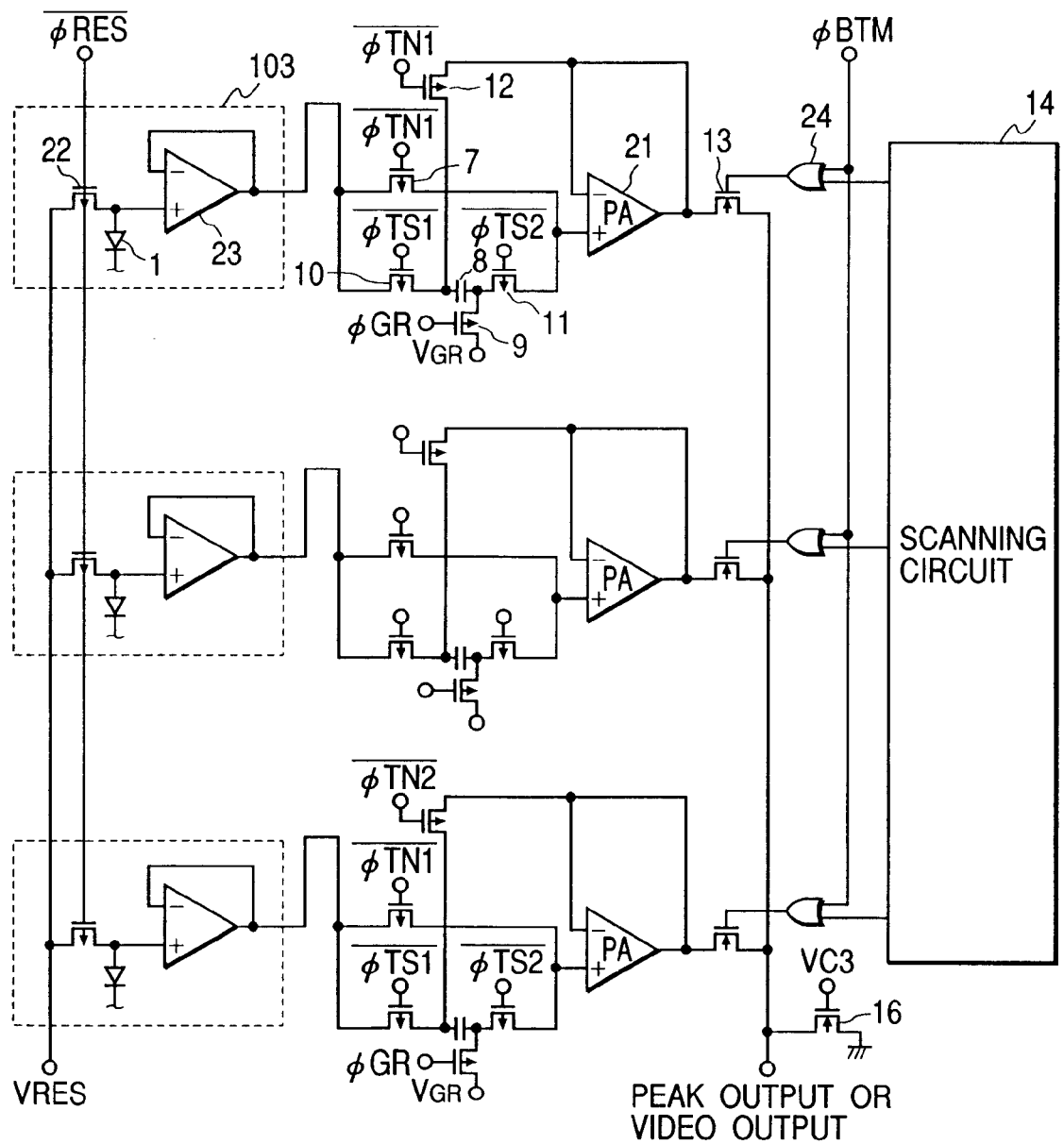
FIG. 17 is a circuit diagram showing the 11th embodiment of the present invention.

FIG. 17 is a circuit diagram showing the 11th embodiment of the present invention.

In this embodiment, in an inexpensive system using a photoelectric conversion apparatus for outputting only the maximum and video signal, signals may be processed without using the minimum. In this case, by imparting the video signal output function to the maximum detection circuit, as in this embodiment, the number of circuits can be further decreased, and the chip area can be further reduced. In addition, the clamp circuit may be omitted, as in the tenth embodiment.

According to this embodiment, a more inexpensive photoelectric conversion apparatus can be realized.

Figure 18:
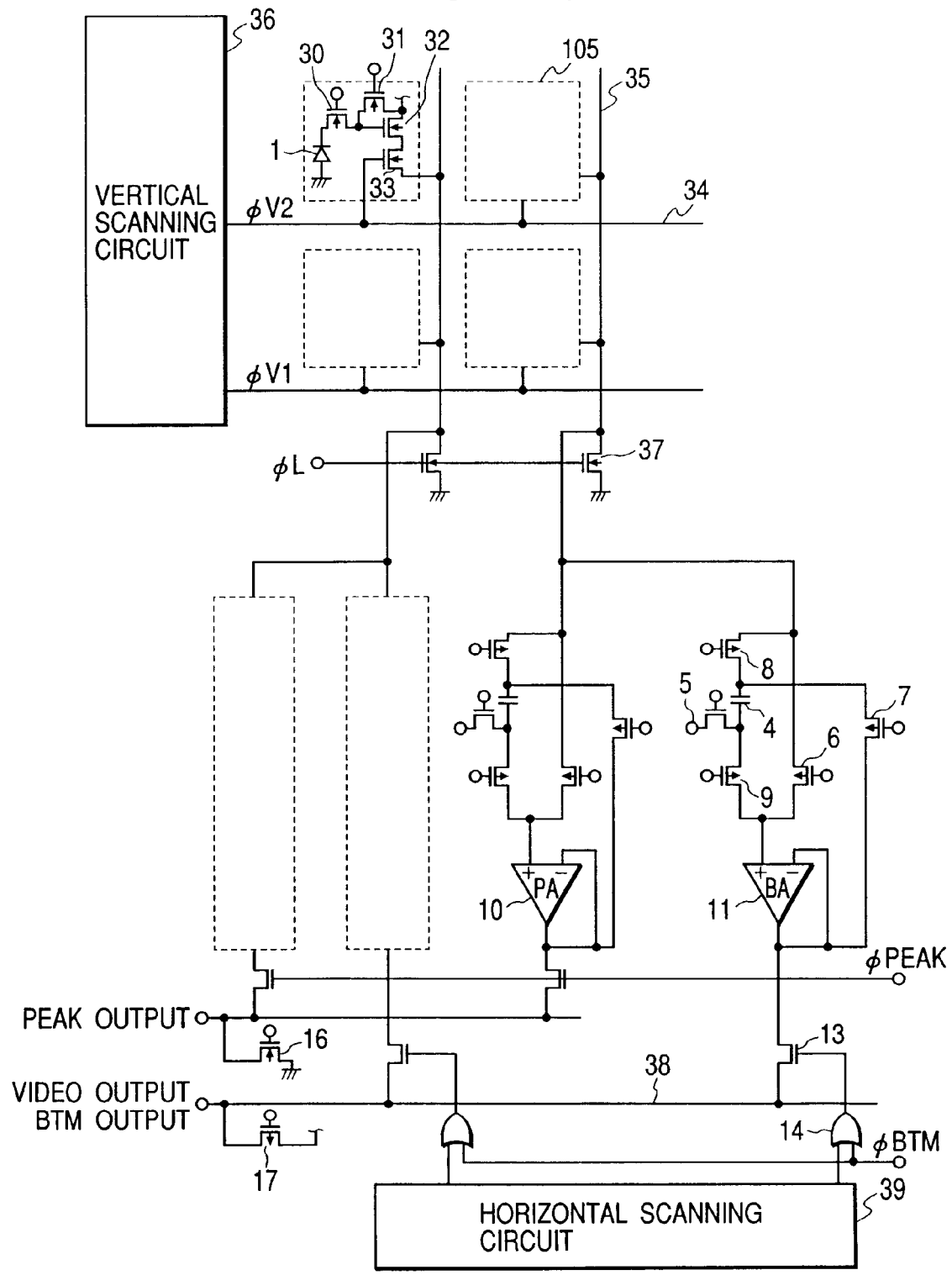
FIG. 18 is a circuit diagram showing the 12th embodiment of the present invention.

FIG. 18 is a circuit diagram showing the twelfth embodiment of the present invention. In this embodiment, photoelectric conversion pixels are two-dimensionally arrayed, and maximum and minimum detection circuits are arranged one each for each column.

A photoelectric conversion pixel 105 comprises a pn photodiode 1 for performing photoelectric conversion, a transfer MOS transistor 30 for transferring signal charges of the pn photodiode, an amplified MOS transistor 32 for amplifying the transferred signal and outputting it, a reset MOS transistor 31 for resetting the transferred signal to a predetermined reset potential, and a selection MOS transistor 33 for selecting the pixel. A constant current source 37 forms a source follower with an amplified MOS transistor. The photoelectric conversion apparatus also has a vertical output line 35, a vertical scanning circuit 36 for sequentially selecting pixels of one row, a horizontal output line 38, and a horizontal scanning circuit 39 for sequentially transferring a signal. The same reference numerals as in FIG. 11 denote the same parts in FIG. 18.

In this embodiment, pixels are selected by the vertical scanning circuit 36 in units of rows, and the same operation as in the first embodiment is performed, thereby obtaining the maximum and minimum outputs and video output of one row.

The photoelectric conversion pixels in the first to twelfth embodiments are not limited to those described above. For example, the photoelectric conversion pixel described in the twelfth embodiment may be used for the eighth embodiment. In this case, since the eighth embodiment is associated with a line sensor, the selection MOS transistor 33 can be omitted. Any circuit arrangement other than the MOS structure may be used. Not only the MOS structure but also a pixel structure such as a BASIS or SIT may be used. Furthermore, not only a photoelectric conversion pixel for converting light into an electrical signal but also a signal source for generating a voltage signal or the like can be used.

In the first to 12th embodiments, the output from the clamp circuit 8 or 9 is output through the voltage follower circuit 6, 20, or 21. However, a circuit for doubling the output from the clamp circuit 8 or 9 and outputting it may be used. In this case, the voltage output from the circuit for doubling the signal, which corresponds to the sum of the noise signal voltage from the photoelectric conversion pixel and the offset voltage of the output circuit, is halved by a resistance or the like and input to the clamp circuit 8 or 9.

Figure 19:
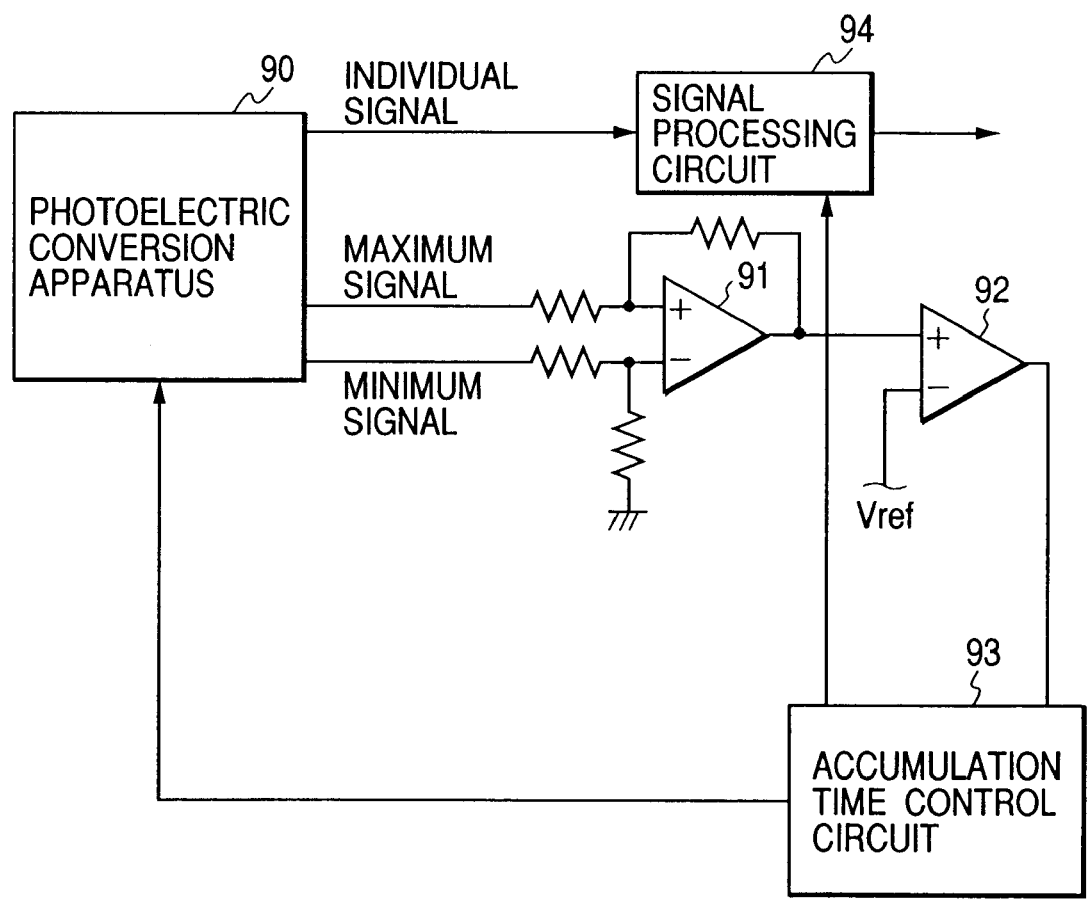
FIG. 19 is a circuit diagram showing the 13th embodiment of the present invention.

FIG. 19 shows the thirteenth embodiment of the present invention. This embodiment presents an image pickup apparatus using the above-described signal processing apparatus shown in the sixth to twelfth embodiments.

The maximum and minimum signals of photoelectric conversion pixel in one row are output from a photoelectric conversion apparatus 90 shown in FIG. 19, differentially amplified by a differential amplification circuit 91, and input to a comparator 92. The output from the comparator 92 is input to an on-chip or external accumulation time control circuit 93. When the output from the differential amplifier is larger than a reference voltage Vref, the accumulation time control circuit controls the photoelectric conversion apparatus to stop accumulating light. In accordance with stop of light accumulation, signals from the photoelectric conversion pixels are individually output and processed by a signal processing circuit 94 by white balance processing, thereby obtaining an image.

In this embodiment, pixels are selected by a vertical scanning circuit 36 in units of rows, and the same operation as in the first embodiment is performed, thereby obtaining the maximum and minimum outputs and video output of one row.

The photoelectric conversion pixels in the eighth to twelfth embodiments are not limited to those described above. For example, the photoelectric conversion pixel described in the 12th embodiment may be used for the eighth embodiment. In this case, since the eighth embodiment is associated with a line sensor, the selection MOS transistor 33 can be omitted. Any circuit arrangement other than the MOS structure may be used. Not only the MOS structure but also a pixel structure such as a BASIS or SIT may be used. Furthermore, not only a photoelectric conversion pixel for converting light into an electrical signal but also a signal source for generating a voltage signal or the like can be used.

Figure 20:
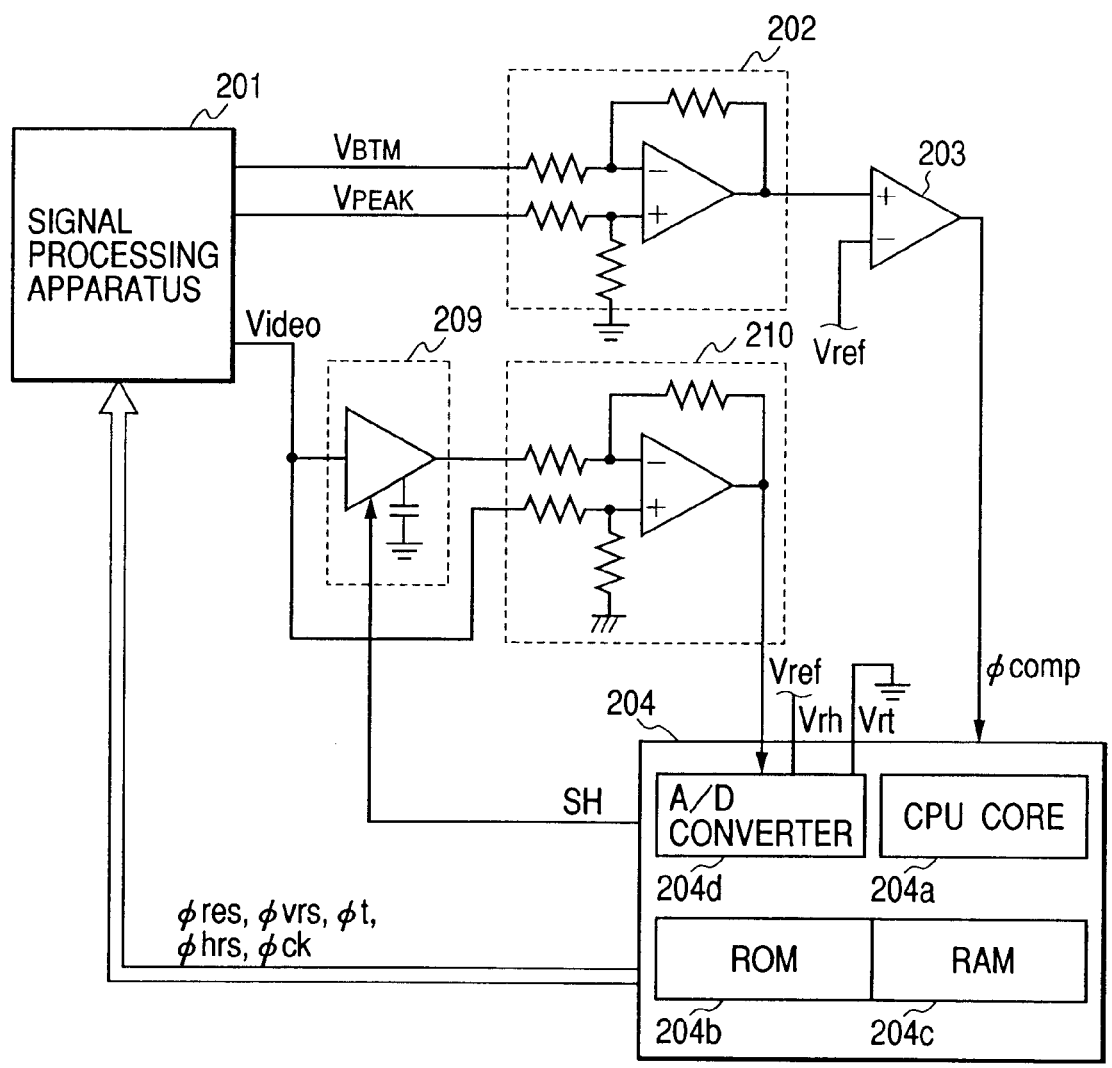
FIG. 20 is a circuit diagram showing the 20th embodiment of the present invention.

FIG. 20 is a block diagram showing a specific image pickup apparatus using the signal processing apparatus described in the first to 12th embodiments.

Referring to FIG. 20, the image pickup apparatus comprises a signal processing apparatus 201 described in the first to 12th embodiments, a differential amplifier 202 for obtaining the difference between a PEAK output $V_{PEAK}$ and BTM output $V_{BTM}$, a comparator 203 for comparing the output from the differential amplifier 202 with a predetermined reference level $V_{ref}$ and determining that the level has reached an appropriate accumulation level, storage circuits 209 and 211 for storing maximum and minimum signals output from the Video line, a differential amplifier 210 for obtaining the difference between the output from the storage circuit 209 and the output from the video output Video, a differential amplifier 212 for obtaining the difference between the outputs from the storage circuits 211 and 209, and a microcomputer 204. The microcomputer comprises a CPU core 204a, ROM 204b, RAM 204c, and A/C converter 204d.

In the image pickup apparatus shown in FIG. 20, first, the microcomputer 204 outputs reset signals $\phi_{res}$ and $\phi_{vrs}$ to start accumulation. Next, in accordance with an inverted signal $\phi_{com}$ from the comparator 203, the microcomputer 204 outputs a signal $\phi_t$ to stop accumulation. Also, signals $\phi^{hrs}$ and $\phi_{ck}$ are output to read signal charges. At this time, the microcomputer 204 sends a sampling signal SH to the storage circuit 209 at the minimum output timing to store the minimum. The subsequent output from the photoelectric conversion element array is A/D-converted after the difference between the output and the minimum is obtained by the differential amplifier 210. Since a reference potential $V_{r1}$ for A/D conversion is set to be the ground potential and a potential $V_{rh}$ is set to be reference voltage Vref, A/D conversion is performed almost between the maximum and minimum of the output from the photoelectric conversion pixel. However, A/D conversion is accurately performed for a high-contrast portion of an object because the minimum as the reference of the output from the photoelectric conversion apparatus is accurately read out.

As has been described above, according to this embodiment, the following effects can be obtained.

A highly accurately signal free from noise can be obtained from a voltage follower circuit.

Cost can be reduced by reducing the chip area.

Since the sensitivity is not decreased by capacitance division, a photoelectric conversion apparatus with high S/N ratio can be realized. When this apparatus is used as an image pickup apparatus, photographing at lower luminance than the prior art is possible.

The simple circuit arrangement can cope with shrinkage in feature size.

Since multiple reads (nondestructive reads) are possible, the apparatus can be used for various application purposes.

Since a peak signal is obtained from a plurality of arbitrary signal sources, the apparatus can be used for various application purposes.

When a peak signal from a plurality of arbitrary photoelectric conversion pixels is used, a clear image can be obtained independently of the contrast of an object.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal processing apparatus comprising, a plurality of signal sources;

specific value detection means for outputting a maximum or minimum signal of said plurality of signal sources, said specific value detection means having a function of sequentially outputting individual signals from said plurality of signal sources and comprising a plurality of voltage follower circuits connected to said plurality of signal sources, respectively, wherein an output portion of each of said plurality of voltage follower circuits comprises a source follower circuit; and driving means for switching the function of said specific value detection means, said driving means switching the function by commonly connecting output portions of said plurality of voltage follower circuits to an output line to output the maximum or minimum signal to said output line and sequentially connecting the output portions of said plurality of voltage follower circuits to said output line to sequentially output the individual signals to said output line, wherein said output line has a constant current source, and wherein when the maximum or minimum signal is to be output, a constant current source of said source follower circuit is turned off and said constant current source of said output line is turned on, and when the individual signals are to be output, said constant current source of said source follower circuit is turned on and said constant current source of said output line is turned off.

2. An apparatus according to claim 1, further comprising noise removal means for removing noise in said signal sources on an input side of said specific value detection means.

3. An apparatus according to claim 2, wherein said noise removal means comprises a clamp circuit.

4. An apparatus according to claim 1, wherein said apparatus further comprises noise removal means on an input side of said voltage follower circuit, said noise removal means removing a noise component level of said signal sources and an offset level in said voltage follower circuit.

5. An apparatus according to claim 1, wherein said signal sources comprise photoelectric conversion pixels.

6. An image pickup apparatus comprising:

a signal processing apparatus according to claim 1;

comparison means for detecting that a difference value between the maximum signal and the minimum signal output from said signal processing apparatus has not less than a predetermined value; and control means for controlling a light accumulation time of a photoelectric conversion pixel in said signal processing apparatus on the basis of an output from said comparison means.

* * * * *

UNITED STATES PATENT AND TRADEMARK OFFICE
CERTIFICATE OF CORRECTION

PATENT NO. : 6,781,624 B1
DATED : August 24, 2004
INVENTOR(S) : Hidekazu Takahashi It is certified that error appears in the above-identified patent and that said Letters Patent is hereby corrected as shown below:

Column 5,
Line 12, "transistor" should read -- transistors --.

Column 10,
Line 45, "$\phi^{hrs}$" should read -- $\phi_{hrs}$ --.

Signed and Sealed this

Sixteenth Day of November, 2004

JON W. DUDAS
*Director of the United States Patent and Trademark Office*